(12) United States Patent
Vogt

(10) Patent No.: US 9,591,948 B2
(45) Date of Patent: Mar. 14, 2017

(54) METHOD FOR STORING USED COOKING OIL

(71) Applicant: Stuart Vogt, Brooks (CA)

(72) Inventor: Stuart Vogt, Brooks (CA)

( * ) Notice: Subject to any disclaimer, the term of this patent is extended or adjusted under 35 U.S.C. 154(b) by 180 days.

(21) Appl. No.: 13/660,456

(22) Filed: Oct. 25, 2012

(65) Prior Publication Data

US 2013/0193084 A1  Aug. 1, 2013

Related U.S. Application Data

(60) Provisional application No. 61/551,191, filed on Oct. 25, 2011.

(51) Int. Cl.

| B01D 12/00 | (2006.01) |
|---|---|
| B01D 49/00 | (2006.01) |
| A47J 37/12 | (2006.01) |
| B01D 21/00 | (2006.01) |
| B01D 21/30 | (2006.01) |

(52) U.S. Cl.
CPC ............ *A47J 37/1223* (2013.01); *A47J 37/12* (2013.01); *A47J 37/1266* (2013.01); *A47J 37/1271* (2013.01); *B01D 21/00* (2013.01); *B01D 21/0018* (2013.01); *B01D 21/30* (2013.01)

(58) Field of Classification Search
None
See application file for complete search history.

(56) References Cited

U.S. PATENT DOCUMENTS

| 3,648,595 | A | * | 3/1972 | Morris | 99/342 |
| 3,869,972 | A | * | 3/1975 | Chase | 99/410 |
| 4,149,973 | A | * | 4/1979 | Harris | 210/305 |
| 4,309,148 | A | * | 1/1982 | O'Hare | 417/18 |
| 4,401,563 | A | * | 8/1983 | Koelfgen | 210/130 |
| 4,478,140 | A | * | 10/1984 | Bullock | 99/404 |
| 4,816,148 | A | * | 3/1989 | Hemman | 210/256 |
| 5,225,085 | A | * | 7/1993 | Napier et al. | 210/705 |
| 5,705,055 | A | * | 1/1998 | Holloway, Jr. | B01D 17/0208 210/115 |
| 5,812,060 | A | * | 9/1998 | DeSpain | A47J 37/1266 340/618 |
| 6,139,730 | A | * | 10/2000 | Buehler | B01D 17/00 210/167.01 |
| 6,517,715 | B1 | * | 2/2003 | Batten | B01D 17/0208 210/232 |
| 6,591,741 | B1 | * | 7/2003 | Martin | 99/408 |
| 2008/0173007 | A1 | * | 7/2008 | Imes | F01N 3/0237 60/274 |
| 2009/0294096 | A1 | * | 12/2009 | Mills et al. | 165/45 |

* cited by examiner

*Primary Examiner* — Joseph Drodge
*Assistant Examiner* — Richard Gurtowski
(74) *Attorney, Agent, or Firm* — Adrian D. Battison; Ade & Company Inc.

(57) ABSTRACT

Method of collecting used cooking oil includes extracting used cooking oil from at least one deep fryer to a container, storing and separating said used cooking oil within the container which is located within the cooking area. The oil from the deep fat fryer is periodically pumped to the container and allowed to settle. The unwanted sludge is then tapped off into a portable container and the wanted oil is pumped to an exterior transportation container. The container is triangular shaped with rear walls converging into a corner of the cooking area and a diagonal front face with side flanges and a bottom flap such that it is located in the corner of an interior wall of a building and contains the pipes and plumbing.

10 Claims, 6 Drawing Sheets

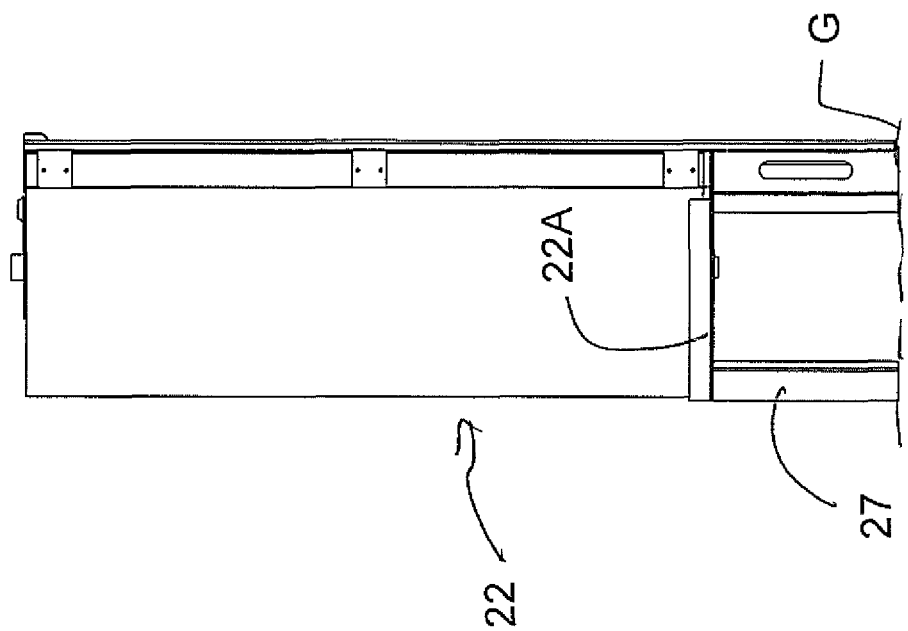

METHOD FOR STORING USED COOKING OIL

This application claims the benefit under 35 USC 119(e) of Provisional Application 61/551,191 filed Oct. 25, 2011.

This invention relates to method and apparatus for storing used cooking oil within a commercial kitchen or the like. More specifically an indoor storage container is arranged for cooking oil separation and storage and for subsequent collection of the useable portion of the oil for transportation to a separate location for use.

BACKGROUND OF THE INVENTION

Fast foot has become a staple of millions of people worldwide. Among the many varieties of food available from these restaurant chains, fried foods are among the most popular. The vast majority of these fried foods are prepared in deep fryers which use a large quantity of cooking oil. When this cooking oil has reached the end of its useful Lifetime, it must be removed from the deep fryer and stored on-site until it can be picked up by an oil disposal/recycling service which often utilizes such oil to power modified motor vehicles. This used cooking oil is typically transferred via large buckets or portable vats and is stored in a makeshift tank typically on the exterior of the building. This storage location exposes the oil to environmental concerns and often results in unwanted odours, spills, trips, leaks, and other problems.

Having recognized the abovementioned problems, the inventor observed there remains a need for a means by which used cooking oil can be safely processed and stored on-site until off-site disposal can be arranged.

SUMMARY OF THE INVENTION

It is one object of the invention to provide a method of collecting used cooking oil.

According to the invention there is provided a method of collecting used cooking oil in a restaurant where one or more deep fat fryers are located in a cooking area, the method comprising;

periodically transferring used cooking oil from said at least one deep fryer to a container;

storing said used cooking oil within the container;

causing separation of the oil within the container by settlement such that a bottom portion of the oil contains unwanted portions and an upper portion of the oil is usable for subsequent processes;

periodically extracting the unwanted portion of used cooking oil from the bottom of the container;

and periodically extracting the wanted portion of used cooking oil by a pump to a remote transportation tank;

wherein the container is located in the cooking area for storage of the oil inside the cooking area and the wanted portion is periodically pumped to a the remote exterior transportation tank in a location exterior to the cooking area.

Preferably the oil is transferred to the container by a pipe is connected at one end to said at least one deep fryer for pumping the oil to the storage container.

Preferably the pipe is arranged to feed the oil into the storage container through a supply inlet from a top of the storage container.

Preferably the supply inlet extending within the container comprises an elongate tube which is perforated with a plurality of longitudinally spaced holes such that oil within the container is not disturbed by oil entering the container.

Preferably the supply inlet extending within the container comprises an elongate tube which has an end outlet arranged to be directed onto a wall of the container.

Preferably the pipe from said at least one deep fryer for pumping the oil to the storage container includes a filter to extract solids from the oil.

Preferably the container has two rear walls at a right angle so as to be shaped to be located in a corner between two walls of the cooking area.

Preferably the container has a front wall diagonal to the rear walls so as to form a generally triangular shape in plan so as to be shaped to be located in the corner.

Preferably the front wall the container has two side flanges lying in a common plane and extending from the rear walls to walls of the cooking area for enclosing piping therebetween.

Preferably the container stands on legs and there is provided a hinged bottom flap at the front wall for covering the legs and for enclosing pipes and at least one pumps.

Preferably there is provided a discharge outlet at the bottom of the container which is connected to a separable discharge pipe which extends from the bottom of the container for discharging the unwanted portion under pressure from the wanted portion above the unwanted portion into a portable container.

Preferably there is provided a discharge mouth for the wanted portion located at position spaced from the bottom of the container through which the wanted portion is pumped to the exterior transportation tank.

Preferably the unwanted portion of the cooking oil when settled to the bottom of the container is tapped off first by pressure from the wanted portion above the unwanted portion.

Preferably a flow reducer on the supply inlet is designed to minimize impact upon the settling process and thereby ensure that maximum settling has occurred prior to the used oil being drained from the tank.

Preferably pressure of the wanted portion of the oil within the container is arranged to push the unwanted cooking oil from container into the portable container.

According to a second aspect of the invention there is provided a method of collecting used cooking oil in a restaurant where one or more deep fat fryers are located in a cooking area, the method comprising;

periodically transferring used cooking oil from said at least one deep fryer to a container;

storing said used cooking oil within the container;

causing separation of the oil within the container by settlement such that a bottom portion of the oil contains unwanted portions and an upper portion of the oil is usable for subsequent processes;

periodically extracting the unwanted portion of used cooking oil from the bottom of the container;

and periodically extracting the wanted portion of used cooking oil by a pump to a remote transportation tank;

wherein the container has two rear walls at a right angle with a front wall diagonal to the rear walls so as to form a generally triangular shape in plan so as to be shaped to be located in a corner between two walls of the cooking area;

Preferably the front wall of the container has two side flanges lying in a common plane and extending from the rear walls to walls of the cooking area for enclosing piping therebetween.

Preferably the container stands on legs and there is provided a hinged bottom flap at the front wall for covering the legs and for enclosing pipes and at least one pump.

An oil present switch is preferably provided to ensure that the pump only runs to pump the oil to the container where oil is present at the inlet line of at the filter. The oil present sensor is very critical aspect to the mechanical systems. It needs to be as reliable as possible. There are many different types of sensors which can be used to accomplish this. The oil present sensor that sits next to the fryer needs to have a high heat threshold. Typical cooking temp is 360 degrees. To overcome this obstacle we can bring down the temperature or use a more resilient sensor.

An container full switch is preferably provided to ensure that the pump only runs to pump the oil to the container when the container has capacity to receive it. This sensor that will sit in the tank this sensor does not need to be heat resistant as the highest temp will probably be 100 degrees.

A dump tank can be provided for manual transportation of the it from the fryer to the container. This makes the retrofitting restaurants a much more manageable process. This will mount up against the wall in the most convenient area. The staff will manually dump the used cooking oil in this tank until the fryer is hard plumbed into the system.

Typically this will be a five gallon stainless steel square tank. It will have a lid and a one inch plumbing access near the very bottom. This dump box when used will contain the oil present sensor which when activated will let the pump know when oil is present.

The tank full sensor can be of any suitable type and is placed 6 inches below the top of the tank at a mounting bracket in the tank.

In the tank is the flow reducer to prevent agitation in the form of a perforated pipe which can be made from Heat sink pipe. This pipe can serve two purposes.

a) It works as a flow reducer as originally intended.

b) It also will help to bring down the temperature several degrees so reducing convectional agitation. The pipe should be no longer than ¾ the height of the tank.

The system can be separated from the electric supply by using batteries and solar panels to generate sufficient energy simply to drive the pumps.

The control box has warning lights, an oil present sensor light, relays and fuses all clearly laid out. Twelve volt and twenty four volt system can be used. For larger commercial application the latter might be beneficial.

BRIEF DESCRIPTION OF THE DRAWINGS

One embodiment of the invention will now be described in conjunction with the accompanying drawings in which:

FIG. 6 is a side elevational view of the container of FIG. 1.

In the drawings like characters of reference indicate corresponding parts in the different figures.

DETAILED DESCRIPTION

In accordance with the invention, the best mode is presented in terms of a preferred embodiment. However, the invention is not limited to the described embodiment and a person skilled in the art will appreciate that many other embodiments are possible without deviating from the basic scope and that any such work around will also fall under the scope of this disclosure. It is envisioned that other styles and configurations can be easily incorporated into the teachings of the present disclosure and only one particular configuration shall be shown and described for purposes of clarity and disclosure and not by way of limitation of scope.

An object of a commercial cooking oil storage unit (herein referred to as an "apparatus") 10 is to solve one or more of the aforementioned problems and fulfill one or more of the aforementioned needs. The apparatus 10 is designed for high-volume commercial applications such as restaurants in which large quantities of used oil must be stored for subsequent pick-up by a dedicated processing vehicle. The apparatus 10 provides convenient indoor storage of used oil while enabling the oil to be removed by a vehicle from outside a building. The apparatus 10 further provides a number of features designed to facilitate the settling process and remove a large percentage of sediment 12 from the oil prior to removal.

Figure 1:
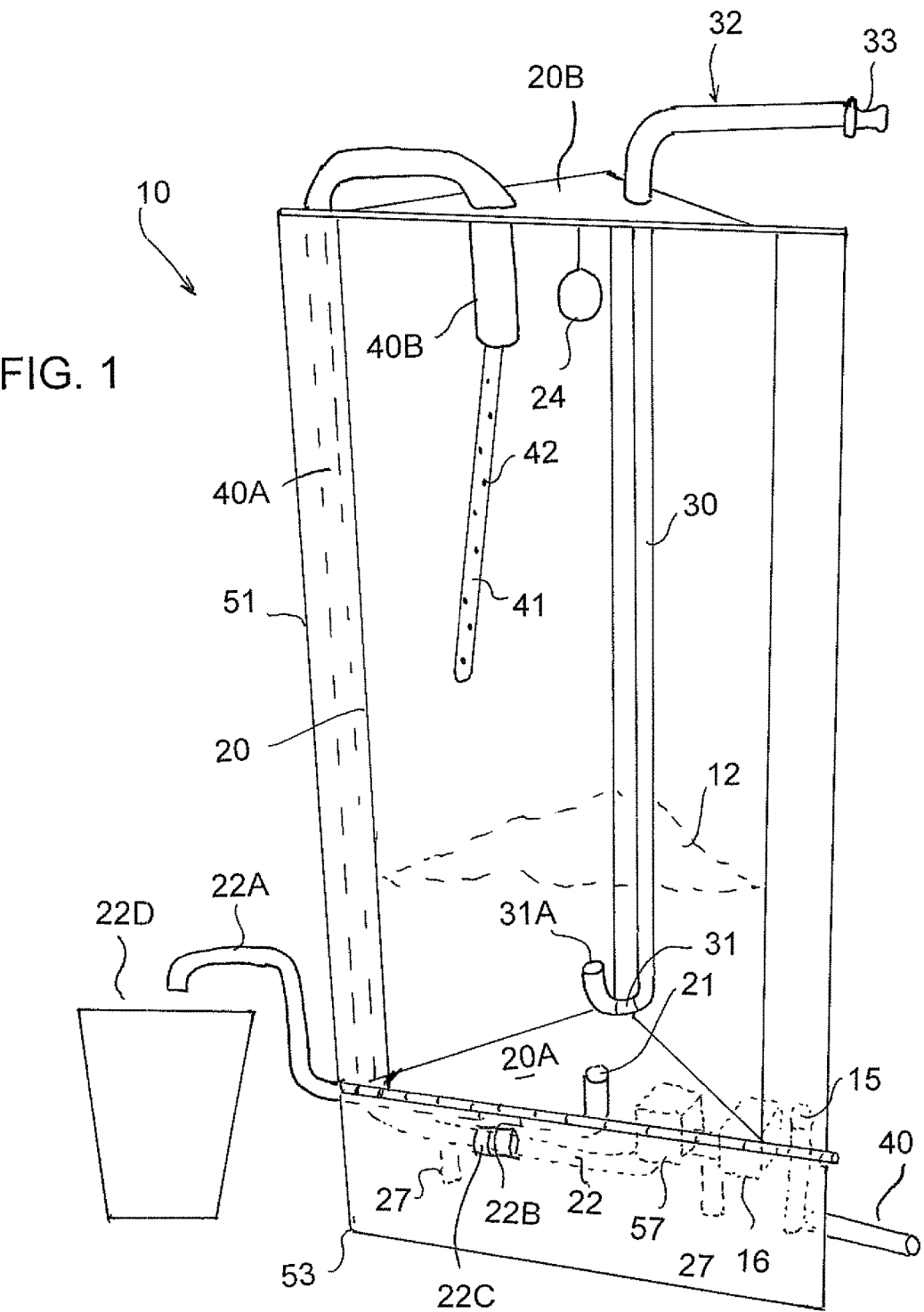
FIG. 1 is an isometric view showing one embodiment of the present invention.
Figure 5:
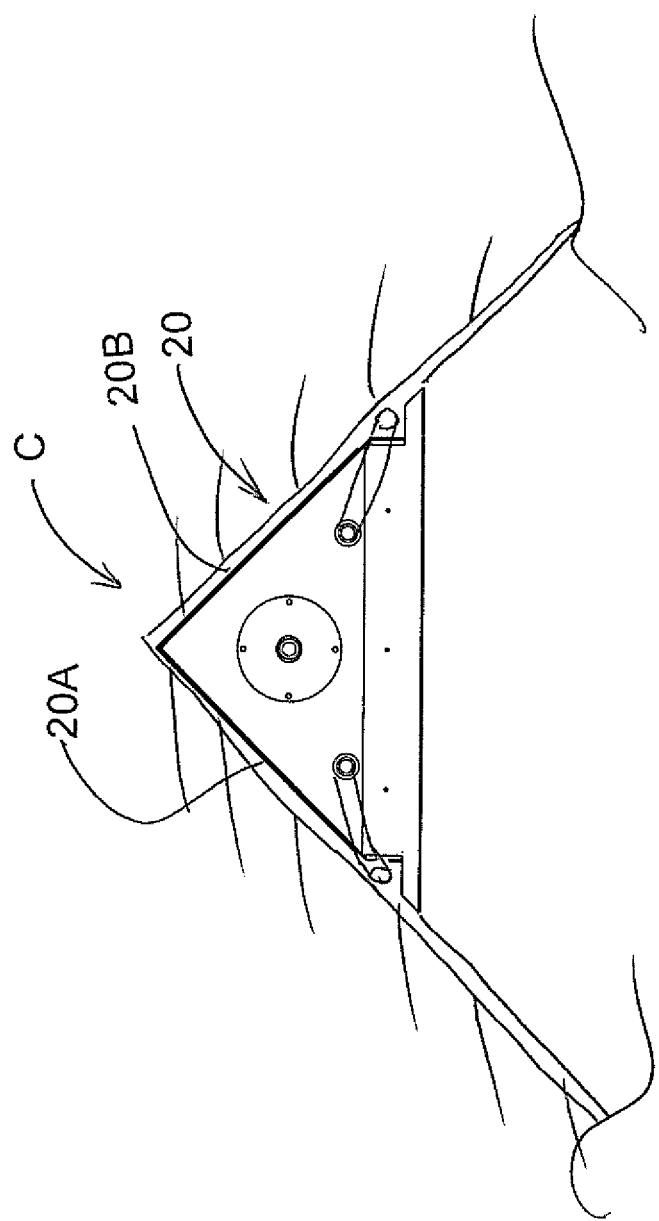
FIG. 5 is a top plan view of the container of FIG. 1 shown in place in a corner of the cooking area.

Referring now to FIG. 1, a perspective view of the apparatus 10 is disclosed. The device comprises a tank 20 constructed from stainless steel or another similar metal suitable for long-term contact with cooking oil. FIG. 1 shows the tank 20 having a front wall removed in order to show the internal components of the apparatus 10, although it can be appreciated that the tank 20 would comprise a hollow fluid-tight enclosure having three or more perimeter sides. The tank 20 can have a transparent section which provides visual indication of the level of oil within the tank 20 during use. The tank 20 preferably comprises a triangular prism shape with one ninety degree (90°) angle between two rear walls 20A and 20B. Thus the tank 20 can be placed within a corner C of an indoor establishment (FIG. 5) and thereby take up a minimum amount of floor space. It can be appreciated that other tank 20 shapes such as rectangular boxes can be utilized with similar effect. The overall height, shape, and dimensions of the tank 20 can be varied based upon the volume of oil to be processed, the particular room in which the tank is to be stored, and other similar factors.

Figure 2:
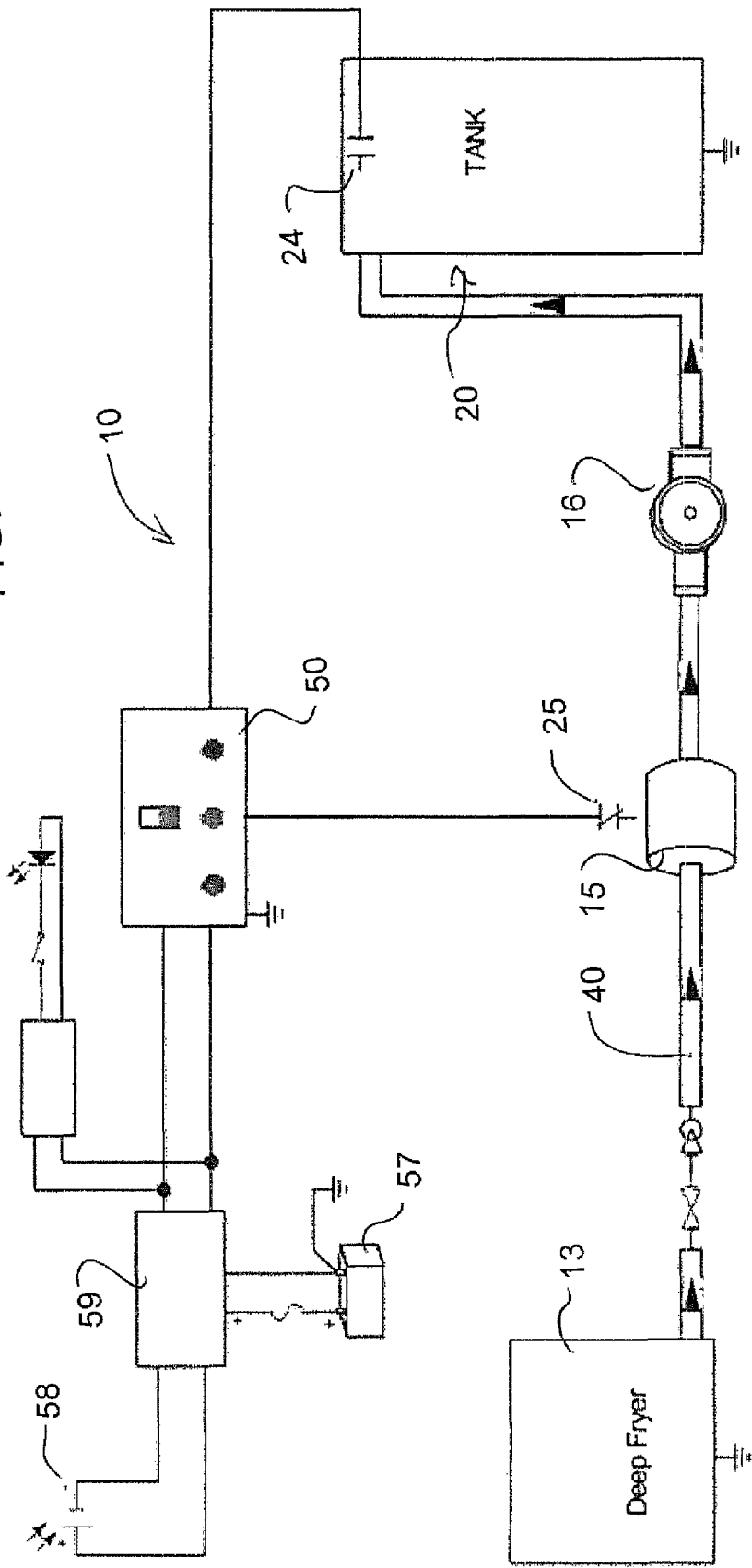
FIG. 2 is a schematic view of the components of the present invention.

As shown in FIG. 2, used cooking oil is pumped into or otherwise delivered to the interior of the tank 20 via in inflow pipe 40. The inflow pipe 40 is in fluid communication with existing cooking equipment such as deep fryers 13 and can be interconnected with existing infrastructure using common plumbing methods. The inflow pipe can also be arranged to have a filter 15 and a pump 16. The used cooking oil stored within the tank 20 is subsequently evacuated via a disposal line 30. A bottom surface 20A of the tank 20 has a drain 21 that connects to a sludge flow pipe 22 located beneath the tank 20. The sludge flow pipe 22 generally comprises a "U"-shaped portion of pipe with an open-ended sludge flow outlet 22A comprising an upwardly-oriented end of the sludge flow pipe 22. The sludge flow pipe 22 further includes an internal ball valve 22C that prevents oil from flowing through the sludge flow pipe 22 when closed. A coupling 22 connects to the discharge pipe 22A which extends outwardly to fill a bucket 22D.

A bottom exterior portion of the bottom surface 20A of the tank 20 comprises a plurality of legs 27 which provide separation between the tank 20 and a ground surface G in order provide space for the sludge flow pipe 22 to pass under and out from the tank 20.

The tank 20 has a float valve 24 affixed to an upper interior portion. The float valve 24 comprises a common electronic float valve which is in electrical communication with a controller 50 which provides a means for automatically ceasing a flow of used oil into the tank 20 when the tank 20 is nearly full.

The disposal line 30 has a bottom end located near to but spaced from the bottom surface 20A of the tank 20. A bottom end of the disposal line 30 comprises a "U"-shaped redirect 31 having an open inlet end 31A which faces upwardly. The elevated and upward-facing construction of the inlet end 31A enables sediment remaining in the used oil to settle along the bottom surface 20A of the tank 20 prior to draining. When used oil within the tank 20 is drained through the inlet end 31A and disposal line 30, the sediment will be minimally disturbed due to the orientation of the inlet end 31A. A top end of the disposal line 31 passes through a top wall 20T of the tank 20. The exterior portion of the disposal line 31 comprises an external connection 32 comprising an integral length of pipe which is routed through a building wall to an exterior portion of the building. The external connection 32 includes an internal oil filter and check valve. A dedicated collection vehicle can connect to the exterior end of the external connection 32 using a cam lock 33 fitting or similar method and pump used oil into the vehicle without having to access the interior of the building. The oil filter prevents large sediment from being collected and the check valve prevents backflow during use. The shape, size, orientation, and length of the external connection 32 can vary based on volume of oil, building construction, tank location, and the like.

The inflow pipe 40 passes through the filter 15 and the pump 16 and connects to a feed pipe 40A extending upwardly along the front of the tank behind the flange 51 and passes through a wall of the tank 30 to form a discharge portion 40B within the interior of the tank 20. An interior end of the inflow pipe 40 comprises a flow reducer 41. The flow reducer 41 comprises an angled length of the pipe with depositing holes 42 for depositing used oil into the tank 20. The flow reducer 41 is angled and positioned near a side of the tank 20 such that oil enters the tank 20 at a rate and angle which reduce the speed and impact of the oil upon deposited sedimentation in the bottom of the tank 20. The flow reducer 41 can comprise a tapered diameter or a smaller diameter than the inflow pipe 40. The flow reducer 41 is designed to minimize impact upon the settling process and thereby ensure that maximum settling has occurred prior to the used oil being drained from the tank 20. Before the tank 20 is drained via the disposal line 30, the remaining oil located below the level of the inlet end 31A of the redirect 31 contains a majority of the sediment from the tank 20 forming an unwanted portion. A user can open the ball valve of the sludge flow pipe 22 in order to flush and drain sediment from the tank 20 via the sludge flow outlet 22A. The used oil drained through the sludge flow pipe 22 can then be transported via a bucket 22D or similar method for disposal.

The apparatus 10 is intended to provide various benefits to a user over existing methods of storing and processing used cooking oil. The apparatus 10 enables inside storage of cooking oil and does not require the use of powered heating elements to moderate the temperature of stored oil. The apparatus 10 provides a flow reducer 41 to minimize disturbance to sediment already within the tank 20, a redirect 31 to minimize the amount of sediment drained from the tank 20, and a sludge flow pipe 22 for removing sediment from the tank 20. The apparatus 10 can be readily adapted to existing equipment and can be designed to fit a variety of spatial and volume requirements.

The tank has a flange 51 along each side of its vertical length with is arranged to enclose the inflow pipe. At the bottom end of the container is a hinged access panel 53. The access panel is hinged at the container such that a user can access a mechanical section 55 of the container. A battery 57, the pump 16 and a filter 15 are located within the mechanical section. A solar panel 58 outside the building supplies power through a controller 59 to the battery 57.

The controller 50 controls operation of the system including the battery power and recharging and the operation of the pump 16 as controlled by the switch 24 and an oil present switch 25.

The method in general provides a series of steps which allow the oil to be stored inside the building in the cooking area to retain it in a heated condition without the very low temperatures which can occur outside.

A dump tank can be provided for manual transportation of the oil from the fryer to the container. This makes the retrofitting restaurants a much more manageable process. This will mount up against the wall in the most convenient area. The staff will manually dump the used cooking oil in this tank until the fryer is hard plumbed into the system.

The oil present switch 25 is provided to ensure that the pump only runs to pump the oil to the container where oil is present at the inlet line or at the filter. As shown in FIG. 2 the switch is located at the filter but other locations are possible. Where a transport container is provided to transfer the oil, the oil present sensor can be located in the transport container.

The container full switch 24 is provided to ensure that the pump only runs to pump the oil to the container when the container has capacity to receive it.

The system can be separated from the electric supply by using the batteries and solar panels to generate sufficient energy simply to drive the pumps.

The control box 50 has warning lights, an oil present sensor light, relays and fuses all clearly laid out. Twelve volt and twenty four volt system can be used.

Figure 3:
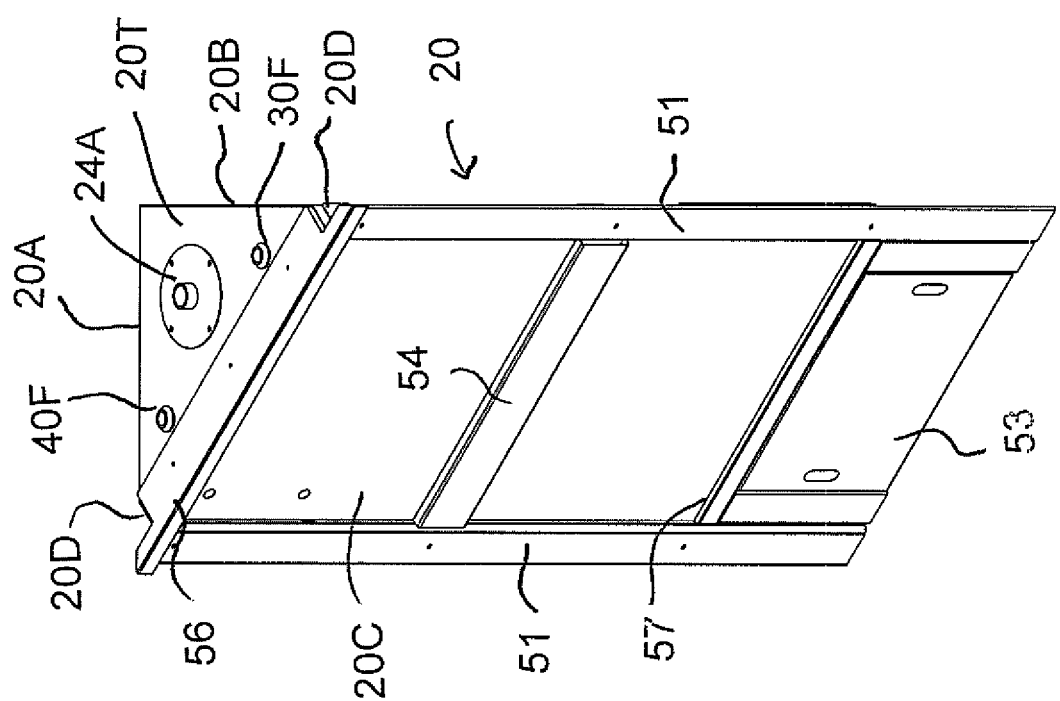
FIG. 3 is an isometric view of the container of FIG. 1.
Figure 4:
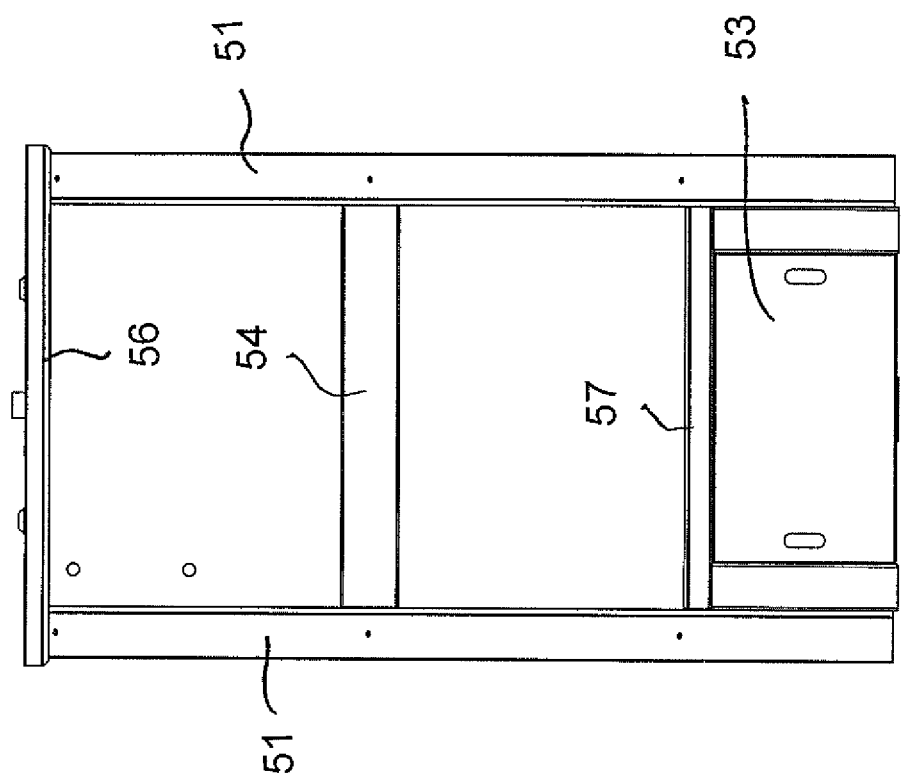
FIG. 4 is a front elevational view of the container of FIG. 1.

The container as best shown in FIG. 3 has a flat front face 20C and the rear walls 20A and 20B which is thus shaped as a triangular tank with two rear walls at a right angle so as to be shaped to be located in the corner between two walls of the cooking area.

The container has the front wall 20C diagonal to the rear walls so as to form a generally triangular shape in plan so as to be shaped to be located in the corner and front wall the container has two side flanges 51 lying in a common plane with the front wall 20A and extending from the front edge of the rear walls 20A, 20B to the walls of the cooking area for enclosing piping therebetween.

The rear walls 20A, 20B lie flush with the walls of the building and include recessed portions 20D behind the flanges 51 within which the pipes can be located. The presence of the flanges 51 and a transverse cross-bar 54 provides stiffening for the tank and particularly the front wall to prevent bowing under loads form the oil contained within the tank. Top bracing plate 56 and bottom bracing strip 57 extend across the top and bottom edges of the front wall again to provide stiffness.

The top wall 20T of the tank contains openings 40F for the pipe 40 and 30F for the pipe 30. A central opening 24A allows access to the switch 24.

The container stands on legs 27 and there is provided a hinged bottom flap at the front wall for covering the legs and for enclosing pipes and at least one pump.

The system operates generally as follows:
1. Periodically pumping used cooking oil when no longer usable from said at least one deep fryer to a container. Typically there are a series of fryers where they are arranged sequentially from cleanest to most contaminated, where each is filled from the next with the oil from the last discharged to the container. The pipe from said at least one deep fryer for pumping the oil to the storage container includes a filter to extract solids from the oil.

2. Storing the used cooking oil within the container. To effect this transfer, the pipe is connected at one end to said at least one deep fryer for pumping the oil to the storage container. The pipe is arranged to feed the oil into the storage container through a supply inlet from a top of the storage container. The supply inlet extending within the container comprises an elongate tube which is perforated with a plurality of longitudinally spaced holes such that oil within the container is not disturbed by oil entering the container. A flow reducer on the supply inlet is designed to minimize impact upon the settling process and thereby ensure that maximum settling has occurred prior to the used oil being drained from the tank. The supply inlet extending within the container comprises an elongate tube which has an end outlet arranged to be directed onto a wall of the container.

3. The oil within the container is separated by settlement so that a bottom portion of the oil contains unwanted portions and an upper portion of the oil is usable for subsequent processes such as bio-diesel.

4. The unwanted portion of used cooking oil is first extracted from the bottom of the container by tapping it off by a separate discharge pipe into a bucket using the pressure from the wanted material above the unwanted material. Periodically the wanted portion is extracted by a pump to a remote transportation tank from a discharge mouth above the bottom of the container. The container is located in the cooking area for storage of the oil inside the cooking area and the wanted portion is periodically pumped to the remote exterior transportation tank in a location exterior to the cooking area.

5. There is provided a discharge outlet at the bottom of the container which is connected to a separable discharge pipe which extends from the bottom of the container for discharging the unwanted portion under pressure from the wanted portion above the unwanted portion into a portable container.

The invention claimed is:

1. A method of collecting used cooking oil comprising;
locating at least one deep fat fryer within an interior cooking area of a restaurant;
providing a storage container within the interior cooking area of the restaurant separate from said at least one deep fat fryer;
periodically and repeatedly causing transference of used cooking oil from said at least one deep fryer to said container;
maintaining all of said used cooking oil from said repeated transferences of said used cooking oil within the container for a storage period;
within the container, during said storage period causing separation of said used cooking oil by settlement such that a bottom portion of the oil at a bottom of the container contains unwanted deposited sedimentation and an upper portion of said used cooking oil is usable for subsequent processes where said subsequent processes are separate from said at least one deep fat fryer;
within the container, during said storage period allowing a temperature of said used cooking oil being stored to fall so as to avoid convection agitation of said deposited sedimentation;
during said transference, causing said used cooking oil to enter the container such that that said used cooking oil enters the container at a rate and angle which prevents impact of said used cooking oil upon said deposited sedimentation in the bottom of the container;
periodically extracting said deposited sedimentation of said used cooking oil from the bottom of the container;
periodically extracting said upper portion of used cooking oil separate from said deposited sedimentation by a pump through a pipe to a remote exterior transportation tank;
wherein the container is located in the interior cooking area for storage of the oil inside the interior cooking area and said upper portion is periodically pumped by said pump through said pipe to said remote exterior transportation tank in a location exterior to said interior cooking area;
and transporting said upper portion to a remote location for subsequent use.

2. The method according to claim 1 wherein the container has two vertical rear walls at a right angle thus defining a corner of the container which is located in a corner between two vertical walls of the interior cooking area with the vertical rear walls of the container parallel to respective ones of the vertical walls of the interior cooking area and a front vertical wall diagonal to the two vertical rear walls so as to form a generally triangular shape in plan.

3. The method according to claim 2 wherein said front vertical wall of the container has two side flanges lying in a common plane of the front vertical wall and extending beyond the two vertical rear walls to the vertical walls of the interior cooking area and enclosing piping therebetween.

4. The method according to claim 2 wherein the container stands on legs extending to a ground surface and there is provided a movable bottom flap at the vertical front wall covering the legs to the ground surface and enclosing pipes and said pump.

5. The method according to claim 1 where there is provided a discharge outlet at the bottom of the container which is connected to a separable discharge pipe which extends from the bottom of the container for discharging the deposited sedimentation under pressure from the upper portion above the deposited sedimentation into a portable container.

6. The method according to claim 1 where there is provided a discharge mouth for the upper portion located at position spaced from the bottom of the container through which the upper portion is pumped to the exterior transportation tank.

7. The method according to claim 6 wherein the deposited sedimentation of the used cooking oil when settled to the bottom of the container is tapped off first by pressure from the upper portion above the deposited sedimentation.

8. The method according to claim 1 wherein a flow reducer on a supply inlet is designed to minimize the impact on said separation.

9. A method of collecting used cooking oil comprising;
locating at least one deep fat fryer within an interior cooking area of a restaurant;
providing a storage container within the interior cooking area of the restaurant separate from said at least one deep fat fryer;

periodically and repeatedly causing transference of used cooking oil from said at least one deep fryer to said container;

maintaining all of said used cooking oil from said repeated transferences of said used cooking oil within the container for a storage period;

within the container, during said storage period causing separation of said used cooking oil by settlement such that a bottom portion of the oil at a bottom of the container contains unwanted deposited sedimentation and an upper portion of said used cooking oil is usable for subsequent processes where said subsequent processes are separate from said at least one deep fat fryer;

within the container, during said storage period allowing a temperature of said used cooking oil being stored to fall so as to avoid convection agitation of said deposited sedimentation;

during said transference, causing said used cooking oil to enter the container such that said used cooking oil enters the container at a rate and angle which prevents impact of said used cooking oil upon said deposited sedimentation in the bottom of the container;

periodically extracting said deposited sedimentation of said used cooking oil from the bottom of the container;

and periodically extracting said upper portion of used cooking oil separate from said deposited sedimentation by a pump through a pipe to a remote exterior transportation tank;

wherein the container has two vertical rear walls at a right angle thus defining a corner of the container which is located in a corner between two vertical walls of the interior cooking area with the vertical rear walls of the container parallel to respective ones of the vertical walls of the interior cooking area;

and wherein the container has a front wall diagonal to the vertical rear walls so as to form a generally triangular shape in plan.

10. A method of collecting used cooking oil comprising;

locating at least one deep fat fryer within an interior cooking area of a restaurant;

providing a storage container within the interior cooking area of the restaurant separate from said at least one deep fat fryer;

periodically and repeatedly causing transference of used cooking oil from said at least one deep fryer to said container;

maintaining all of said used cooking oil from said repeated transferences of said used cooking oil within the container for a storage period;

within the container, during said storage period causing separation of said used cooking oil by settlement such that a bottom portion of the oil at a bottom of the container contains unwanted deposited sedimentation and an upper portion of said used cooking oil is usable for subsequent processes where said subsequent processes are separate from said at least one deep fat fryer;

within the container, during said storage period allowing a temperature of said used cooking oil being stored to fall so as to avoid convection agitation of said deposited sedimentation;

during said transference, causing said used cooking oil to enter the container such that that said used cooking oil enters the container at a rate and angle which prevents impact of said used cooking oil upon said deposited sedimentation in the bottom of the container;

periodically extracting said deposited sedimentation of said used cooking oil from the bottom of the container;

and periodically extracting said upper portion of used cooking oil separate from said deposited sedimentation by a pump through a pipe to a remote exterior transportation tank;

wherein the container has two vertical rear walls at a right angle thus defining a corner of the container which is located in a corner between two vertical walls of the interior cooking area with the vertical rear walls of the container parallel to respective ones of the vertical walls of the interior cooking area;

wherein the container has a front wall diagonal to the vertical rear wall so as to form a generally triangular shape in plan;

wherein the front wall of the container has two side flanges lying in a common plane with the front wall and extending from the vertical rear walls of the container to the two vertical walls of the interior cooking area and enclosing piping therebetween;

and wherein the container stands on legs extending to a ground surface and there is provided a bottom flap lying in a common plane with the front wall at the front wall extending downwardly covering the legs to the ground surface and enclosing pipes and said pump, the bottom flap being movable to access the pump.

* * * * *